United States Patent [19]
Bartling et al.

[11] Patent Number: 5,182,810
[45] Date of Patent: Jan. 26, 1993

[54] ISOLATION GATES TO PERMIT SELECTIVE POWER-DOWNS WITHIN A CLOSELY-COUPLED MULTI-CHIP SYSTEM

[75] Inventors: James E. Bartling, Dallas; Wendell L. Little, Denton; Kevin E. Deierling, Dallas, all of Tex.

[73] Assignee: Dallas Semiconductor Corp., Dallas, Tex.

[21] Appl. No.: 359,246

[22] Filed: May 31, 1989

[51] Int. Cl.⁵ .......................... H02J 1/00; H02J 3/14; G01R 19/00
[52] U.S. Cl. .................... 395/750; 364/707; 364/DIG. 1; 364/273.1; 364/DIG. 2; 364/948.8
[58] Field of Search ............. 364/200, 900, 707; 395/750

[56] References Cited

U.S. PATENT DOCUMENTS

| | | | |
|---|---|---|---|
| 4,317,181 | 2/1982 | Teza et al. | 364/707 |
| 4,404,972 | 9/1983 | Gordon et al. | 128/49 PG |
| 4,409,665 | 10/1983 | Tubbs | 364/707 |
| 4,451,742 | 5/1984 | Aswell | 307/66 |
| 4,464,584 | 8/1984 | Hentzschel et al. | 307/200 |
| 4,521,870 | 6/1985 | Babbel et al. | 364/900 |
| 4,570,217 | 2/1986 | Allen et al. | 364/188 |
| 4,615,005 | 9/1986 | Maejima et al. | 364/200 |
| 4,627,022 | 12/1986 | Mensink et al. | 364/900 |
| 4,747,041 | 5/1988 | Engel et al. | 364/200 |
| 4,851,987 | 7/1989 | Day | 364/200 |
| 4,980,836 | 12/1990 | Carter et al. | 364/483 |

FOREIGN PATENT DOCUMENTS

0077845 10/1981 European Pat. Off. .

OTHER PUBLICATIONS

D. Hodges, *Analysis and Design of Digital Integrated Circuits*, published 1983 by McGraw-Hill Book Co. (New York) pp. 96-109, 378-381.

A. Seidman, *Electronics: Devices, Discrete and Integrated Circuits*, published 1977, by Charles E. Merrill Publishing Co., (Columbus), see pp. 341-377.

*Primary Examiner*—Dale M. Shaw
*Assistant Examiner*—Robert Hauser
*Attorney, Agent, or Firm*—Worsham, Forsythe, Sampels & Wooldridge

[57] ABSTRACT

A battery-backed ancillary power-management chip, in combination with a battery-backed microprocessor or microcontroller, permits a low-power system to achieve a zero-power standby mode with full non-volatility. The ancillary chip contains transmission gates which can cut off the connection between two other chips if one of them is turned off. This avoids problems of power leakage, substrate pumping, etc., when two chips which are connected together can be independently powered up or powered down.

Also provided is a portable data module, which includes a microprocessor and a large LCD display. The disclosed inventions permit the user to operate the display without powering up the microprocessor (to preserve a complex display, e.g. when the user has provided no inputs for a certain length of time), or to operate the microprocessor without the display (e.g. for data transfer or reduction operations).

35 Claims, 6 Drawing Sheets

ISOLATION GATES TO PERMIT SELECTIVE POWER-DOWNS WITHIN A CLOSELY-COUPLED MULTI-CHIP SYSTEM

PARTIAL WAIVER OF COPYRIGHT

All of the material in this patent application is subject to copyright protection under the copyright and/or maskwork protection laws of the United States and of other countries. As of the first effective filing date of the present application, this material is protected as unpublished material. However, permission to copy this material is hereby granted to the extent that the copyright owner has no objection to the facsimile reproduction by anyone of the patent document or patent disclosure, as it appears in the U.S. Patent and Trademark Office patent file or records, but otherwise reserves all copyright rights whatsoever.

CROSS-REFERENCE TO OTHER APPLICATIONS

The following applications of common assignee contain related subject matter, and are believed to have effective filing dates identical with that of the present application:

Ser. No. 359,301., filed May 31, 1989, now abandoned, which is the parent of Ser. No. 760,837, filed Sep. 16, 1991, entitled "MICROPROCESSOR SYSTEM WITH ZERO-POWER STANDBY";

Ser. No. 359,177, filed May 31, 1989, entitled "LOW-POWER SYSTEM WITH MULTIPLE INDEPENDENTLY CONTROLLED SUPPLIES", now abandoned;

Ser. No. 359,194, filed May 31, 1989, entitled "SYSTEM WITH DOUBLY CONDITIONAL WAKEUP", now abandoned;

Ser. No. 359,184, filed May 31, 1989, entitled, "POWER CONTROLLER WITH DC/DC CONVERSION ENABLED BY REVERSAL OF BATTERY/GROUND CONNECTIONS", now abandoned;

Ser. No. 359,292, filed May 31, 1989, entitled "MICROPROCESSOR SYSTEM WITH IMPROVED TIMING CONTROL INPUTS", now abandoned; and Ser. No. 359,446, filed May 31, 1989, entitled "SELF-STARTING TEST SYSTEM", now U.S. Pat. No. 4,952,817; all of which are hereby incorporated by reference.

BACKGROUND AND SUMMARY OF THE INVENTION

The present invention relates to low-power systems and subsystems employing microprocessors, and to integrated circuit elements which help to manage the low-level operation of a microprocessor.

Requirements of Low-Power Systems

The very rapid progress of integrated circuit complexity generally, and the general use of CMOS processing, have permitted a huge increase in the functionality which can be included in a portable system with very modest power supplies. The availability of low-power LCD displays has further speeded the advance of such systems. However, power supply capabilities have not advanced as rapidly. Battery technology has provided a relatively slow increase in the amount of energy which can be stored per unit weight (or per unit volume). Thus, in order to provide complex functionality in a small portable module, a very high degree of power efficiency has become an enabling technology.

Low-power microcontrollers have also been commercially available in recent years. An unusual example of such a microcontroller is the DS5000 Soft MicroController TM. (This integrated circuit, and its data sheet and user's guide, are available from Dallas Semiconductor Corporation, 4350 Beltwood Parkway, Dallas, Tex. 75244, and are hereby incorporated by reference.) The DS5000 is a microcontroller which has a small battery packaged with it, to provide nonvolatility. Microprocessors and microcontrollers of this kind are extremely useful, since the internal memory of the microprocessor is always preserved. Therefore, the microprocessor can be programmed to "learn" while in service, or to internally store a parameter set which is adjustable throughout the lifetime of the microprocessor.

In low-power battery-operated systems, power conservation when the system is inactive is extremely important. In most portable applications, the great majority of the design lifetime will be spent in an inactive state. The power consumption in a standby mode (where no gates are switching), or even in a sleep mode (where the power supply is disconnected from some circuits on-chip) will always be non-zero, due to junction leakage in the circuits which are connected to the power supply. Even the small currents caused by leakage may be important over the total lifetime of the part, and in relation to the high power efficiencies which are obtained in the other modes of operation.

Innovative System with Ancillary Integrated Circuit

The low-power system architecture disclosed in the present application uses an ancillary power-management chip together with a battery-backed microprocessor (and other system elements if desired), to provide a very versatile architecture which can provide extremely low-powered operation. In fact, the presently preferred embodiment permits a system to consume zero power until it is commanded to turn on.

Normally, even the most power-efficient low-power systems will have operating modes which include only active, idle, and sleep modes (or their equivalents). The present invention adds a fourth mode, in which the system consumes essentially ZERO power. Even the DS5000 power-management architecture cannot accomplish this without help. The presently preferred embodiment accomplishes this zero-power standby mode by using an ancillary chip which controls certain inputs to the DS5000. The ancillary chip is always connected to the power supply, but it can connect and disconnect other chips from the power supply.

The present invention provides a system where a nonvolatile microcontroller (or microprocessor, or other complex integrated circuit) is combined with an ancillary chip which performs power-management functions. The power to the microcontroller is routed through switches in the ancillary chip, so that the ancillary chip can disconnect all power to the microcontroller, or restore power. Thus, the ancillary chip permits the microcontroller to go into a state of ZERO power consumption.

The ancillary chip can detect the need for a power-up transition, and may therefore be thought of as a "kick-starter" for the microcontroller. The ancillary chip, rather than the microcontroller, monitors the inputs necessary to wakeup the system when needed. (For example, these inputs preferably include an alarm signal from a timer, and external interrupt and/or reset signals.) The ancillary chip needs only a small amount of logic to perform these monitoring functions, so that, when the system is in standby mode (with the microcontroller in its zero-power mode), the ancillary chip draws less current than the microprocessor would draw in standby mode.

The ancillary chip, in the presently preferred embodiment, does not dissipate any current (except for junction leakage) while in standby. Weak internal pull-ups are used, to ensure that the potential of the input nodes does not float to an intermediate level which could cause excessive leakage current to flow through the active devices at the input.

The device structure and layout techniques of the ancillary chip of the presently preferred embodiment are in most respects conventional. However, a few unusual features are added, to minimize leakage currents. In some locations, the device sizes are increased slightly, so that the gate length is greater than the minimum geometry (while still keeping the same width/length ratio). In addition, the number of powered nodes, while the ancillary chip is in standby mode, is minimized. It should also be noted that the ancillary chip is powered by battery voltage less a diode drop, which in the presently preferred embodiment is well under 3 V, and this lowered supply voltage helps to reduce the leakage current consumed by the ancillary chip.

Independently Controlled Power Supplies

Even with a microcontroller which is optimized for low-power applications, the ancillary chip of the presently preferred embodiment can provide significant power savings. However, the ancillary chip of the presently preferred embodiment also includes additional innovative teachings, which provide many additional capabilities and result in many additional system-level advantages.

The ancillary chip of the presently preferred embodiment can switch multiple power outputs independently. This provides tremendous advantages in complex systems, since the designer can choose some functions to be unconditionally powered, and other functions to be conditionally powered. For example, the microprocessor (or other VLSI chip) can be powered down while a low-power display is left operative, or the display can be left unpowered, after the microprocessor is powered up, until software indicates that the display should be activated. Functions such as a timer, or memory, or a communications channel receiver can be left powered up unconditionally, since these functions may provide an external source of power-up interrupts.

Microprocessor with Suicide Power-Down Capability

Note that the microprocessor 120 can also turn off its own power supply (by requesting the ancillary chip to disconnect VCCO1).

Isolation of Signal Lines between Independently Powered Chips

A further teaching is that the ancillary chip contains transmission gates which can cut off the connection between two other chips if one of them is turned off. This avoids problems of power leakage, substrate pumping, etc., when two chips which are connected together can be independently powered up or powered down.

This teaching is believed to be very advantageous in a wide variety of systems. This teaching impacts system design in at least two ways: it has important implications for system configurations which include more than one independently powered complex chip; and it also has important implications for communication between a low-power VLSI chip and the outside world.

A sample system configuration where the first consideration dominates is a handheld data module, which includes a microprocessor, memory, and a large LCD display. (Such modules have often been proposed for use in computer-integrated manufacturing.) In this case, it may be desirable, for example, to operate the display without the microprocessor (when the user has provided no inputs for a certain length of time), or to operate the microprocessor without the display (e.g. for data transfer or reduction operations).

The second of these considerations is important in a broader class of cases, where a low-power microprocessor system must monitor a communications link to the outside world. For example, the microprocessor might be interfaced, through a UART chip and a line driver/receiver, to an RS232 communication line. If software (or user input) indicates that the bus need not be monitored, the link from the microprocessor to the interface chips may be disconnected, and the interface chips may be powered down. If the microprocessor needs to go into a zero-power mode, the interface chips may be left powered (at least on the receive side), so that the microprocessor can be powered up to respond to incoming signals.

In the presently preferred embodiment, the ancillary chip monitors the transmit signal from the line-driver/receiver side of these interrupted channel links, and can activate the powered-down microcontroller if an edge is detected on the interrupted channel being monitored. When such an edge is detected (on the IO1/RX-DETECT line, in the preferred embodiment), a latch is set to turn on power to the receiving chip, and open the transmission gate to transmit the signal to the receiving chip. Thus the same line can be used for communications, and to initiate communication.

Verification of Microprocessor Wakeup

During power-on reset, the outputs of the microprocessor will be essentially random. Therefore, the ancillary chip sends a signal to the microprocessor on a bidirectional interrupt line, and checks the microprocessor's response, before enabling input connections from the microprocessor. This is accomplished, in the presently preferred embodiment, by using a purely electrical relationship to test the operation of the microprocessor's port.

Logic Outputs which Mirror Power-Switching Status

In some embodiments of the invention, logic outputs are used to mirror switched-power outputs (such as VCCO1). (For example, in the preferred embodiment the signals PWRON and PWRON* mirrot the state of VCCO1.) This is advantageous in permitting further control relationships to make use of logic signals which represent the power-switching status. In particular, these signals are advantageously used to control latches, so that valid data outputs can remain valid even after the microprocessor which generated the data has been powered down.

Doubly Conditional Wakeup

A further innovative teaching is a way for a low-power system to monitor external conditions which may require the system to wakeup, without the power consumption of continuous monitoring. Some conditions are not easy to monitor passively. For example, a disclosed system embodiment (described below) uses an LED with a photodiode to detect whether a sample has been inserted into a test station. The LED draws a relatively high current, so this circuit must not be powered up continuously. There are many other types of sensors which have comparable power characteristics: for example, there are proximity detectors which use capacitive or magnetic coupling; various types of reflectometry systems, including radar, optical, or acoustic; chemical detectors; and many others.

In the presently preferred embodiment, the system will wake up if a target sensor reading occurs, but the system wakeup is doubly conditional: the sensor is turned on only when a timer indicates that it is time for a sense reading, and the microcontroller is awakened only if the sensor output reading corresponds to a predetermined condition. Thus, the sensor is polled as needed, with very low power consumption. This system implementation is very flexible: for example, the frequency of polling can easily be reprogrammed. In some systems, the sensor threshold at which wakeup will occur can be reprogrammed. Optionally, the ancillary chip can be connected to initiate a sensor polling event (or cycle of events) upon receiving an appropriate external command.

Pin-Saving Input Configurations

A further innovative feature in the ancillary chip of the presently preferred embodiment is the ability to receive configuration commands by detecting the configuration of connections. The possible configurations are defined so that the connections serve not only to provide commands to the ancillary chip, but also serve other functions as well. This economizes on the use of pins in the final package.

Selective Connection Reversals

One such innovative teaching is the reversal of the battery connection, on one pair of pins, to indicate whether or not voltage-boosting (DC-to-DC voltage conversion) is required. Thus, the ancillary chip of the presently preferred embodiment can be used (for example) to provide 5 V power from either a 3 Volt or a 6 Volt battery input.

The ancillary chip detects the polarity with which the user has connected power and ground inputs to the two input pins VDCI and VDCO. This permits this user selection to be received on-chip without using up any pins. If a first one of these pins is connected to the power supply, and the second one of these pins is grounded, then voltage conversion will be disabled. However, if the power supply is connected to the second pin, and the first pin is grounded through a reactive network, then the integrated circuit will perform voltage conversion. Moreover, in this case the integrated circuit, in the preferred embodiment, will make use of the reactances connected to the second pin, to assist in the voltage boosting.

In the configuration in which voltage boosting is desired, a discrete inductance, in the presently preferred embodiment, is connected between one pin and the power supply, and a discrete capacitor is connected between the other pin and ground. However, of course, a wide variety of other reactive configurations could be used instead.

Bootstrapping with Voltage Boosting

A number of presently available integrated circuits have the ability to perform DC-DC voltage conversion. However, the ancillary chip of the presently preferred embodiment has the advantage that this feature is selectable, so that a system designer can use this capability or not.

In the ancillary chip of the presently preferred embodiment, the chip's own power supply is boosted before the external load is boosted. This provides the advantage that, under some worst-case conditions (low supply voltage and low-impedance load) the voltage-boosting circuit may be able to start itself up, when it would not otherwise be able to.

Time Constant Definition with Level/Edge Triggering Selection

Another innovative teaching is the use of one of the pins (the "MODE3" pin, in the presently preferred embodiment) to select whether a certain input (the "ON3" input, in the preferred embodiment) is to be edge-triggered or level-triggered, and also for connection of components (e.g. a simple RC network) to define a time constant used in level detection.

Sample System Configuration

An example of an application where "self-start" capability is useful is in a test station for medical samples. Ideally, such a station should be able to sit idle on a countertop until a sample is inserted, and then instantly come to life.

An innovative system disclosed herein provides exactly that capability. This system is fully battery-powered, which not only adds convenience, but also provides advantages of reliability and safety in a carefully controlled environment.

This innovative system embodiment provides a test system in a standalone chassis without a power cord. The testing subsystem (e.g. a spectrophotometer) is microprocessor-controlled, and the microprocessor is disconnected from the battery during normal operation. An ancillary integrated circuit controls the power supply to the microprocessor, and periodically powers up a proximity sensor subsystem (e.g. a photodiode/LED pair), without powering up the microprocessor. The ancillary circuit powers up the microprocessor IF the proximity sensor subsystem, after being activated, indicates that a sample has been inserted by a user. The microprocessor can then operate the testing subsystem, and provide output data to a display driver accordingly.

The disclosed system never needs to be turned on or off (from the user's point of view). It simply waits until a sample is inserted. Whenever a sample is inserted, the machine will promptly detect this, and initiate test procedures.

Thus, this teaching provides a test system with no switches and no cord, whose outside interface consists solely of a slot for physical samples and a display for results. This clean interface adds to reliability and to physical cleanliness, and thus can be very advantageous in medical applications.

System-Level Advantages

Systems and subsystems using the disclosed innovative ancillary chip can provide at least the following features and advantages:

The power management functions of the ancillary chip help to conserve power in battery-operated systems;

The standby current drain is extremely low;

The system can be left in a sleep mode, and yet will be "Kickstarted" (system power turned on) by external events such as Photodiode sensor trip, Clock/calendar alarm, or other low-level signal transition;

The system can shut down power under software control;

The voltage of a long-lifetime battery can be stepped up (for example, a 3 V lithium battery can be stepped up to provide a voltage to +5 V) using integral DC-DC converter;

A DS5000 Soft Microcontroller can readily be placed in serial load mode for remote downloading of new program code.

BRIEF DESCRIPTION OF THE DRAWINGS

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment, wherein these innovative teachings are advantageously applied to a system which includes a kickstart ancillary chip 100, a DS5000 nonvolatile microcontroller, an LCD display, a DS1209 wireless data receiver, and an LED/photodiode sensor interface. However, it should be understood that this embodiment is only one example of the many advantageous uses of the innovative teachings herein.

In the presently preferred system embodiment, the ancillary chip interfaces to a DS5000 nonvolatile microcontroller. However, it should be appreciated that a wide variety of other microcontrollers, microprocessors, or other complex integrated circuits could be used instead.

The ancillary (or "kickstart") chip 110, in the presently preferred embodiment, is a CMOS chip that orchestrates power conservation in battery-operated systems. Using its integral DC-DC converter, the ancillary chip will provide +5 V to the system from either a 3 or 6 volt battery input. The +5 V outputs can be selectively turned on or off based on momentary system events. A system using this ancillary integrated circuit can "wake up" from an ultra-low power state, perform a task and then go back to sleep until the ancillary chip is signalled to "kickstart" system operation again. "Kickstarting" occurs whenever the ancillary chip senses a logic transition or alarm from an external device such as a timer chip. (For example, the presently preferred system embodiment includes a DS1284 Watchdog Timekeeper chip, among other components. The DS1283, DS1284, and their respective data sheets are available from Dallas Semiconductor Corporation, 4350 Beltwood Parkway, Dallas Tex. 75244, and are all hereby incorporated by reference.) In this configuration, a system can be programmed to wake up at a certain time and date, take a reading from a sensor, store that reading in the DS5000 Soft Microcontroller, and then go back to a zero-power state.

Sample System Configuration

Figure 1:
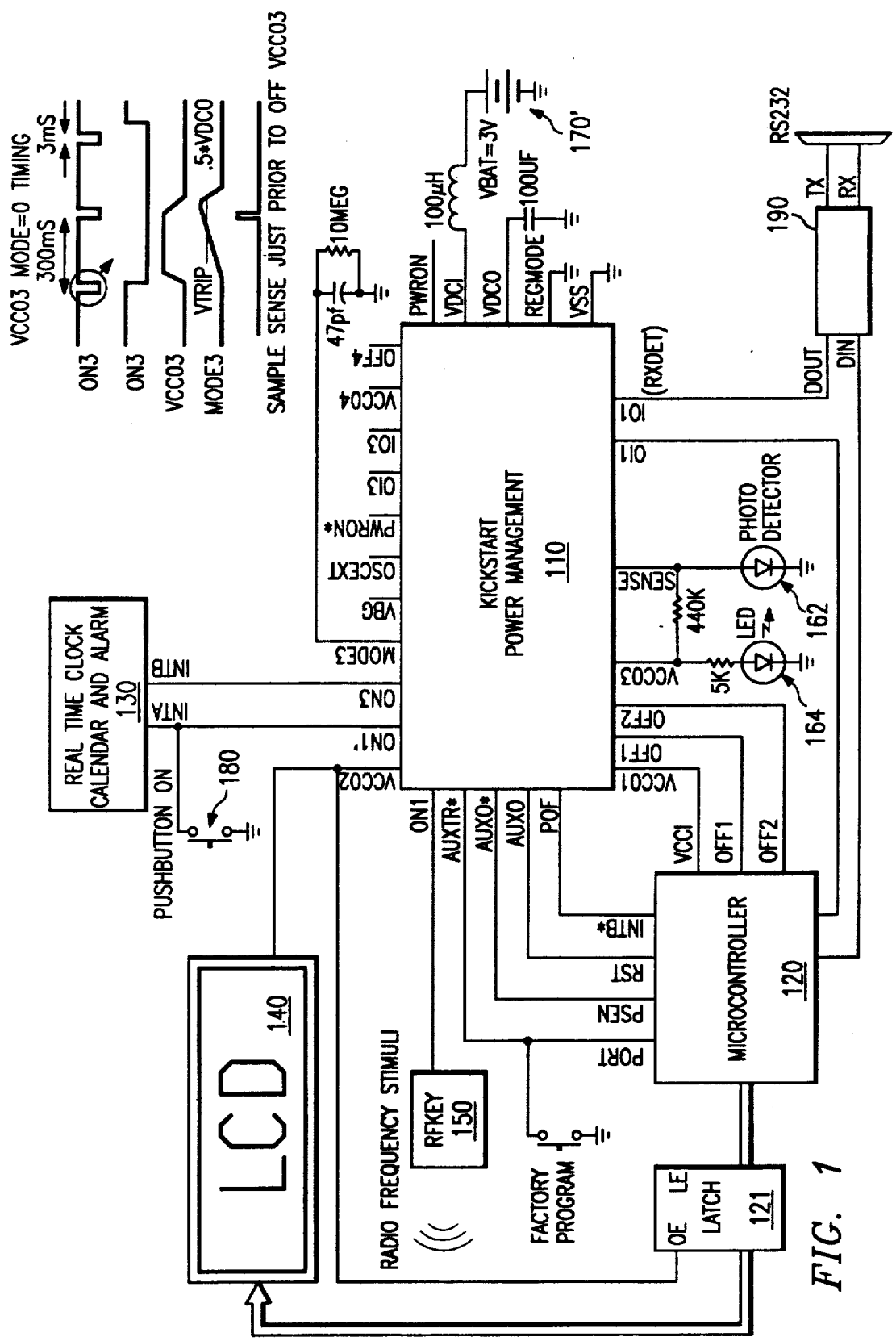
FIG. 1 shows a first sample system configuration, where an RC circuit is tied to the MODE3 input of the ancillary chip, and a 3 Volt battery is connected to the VDCI input.
Figure 2:
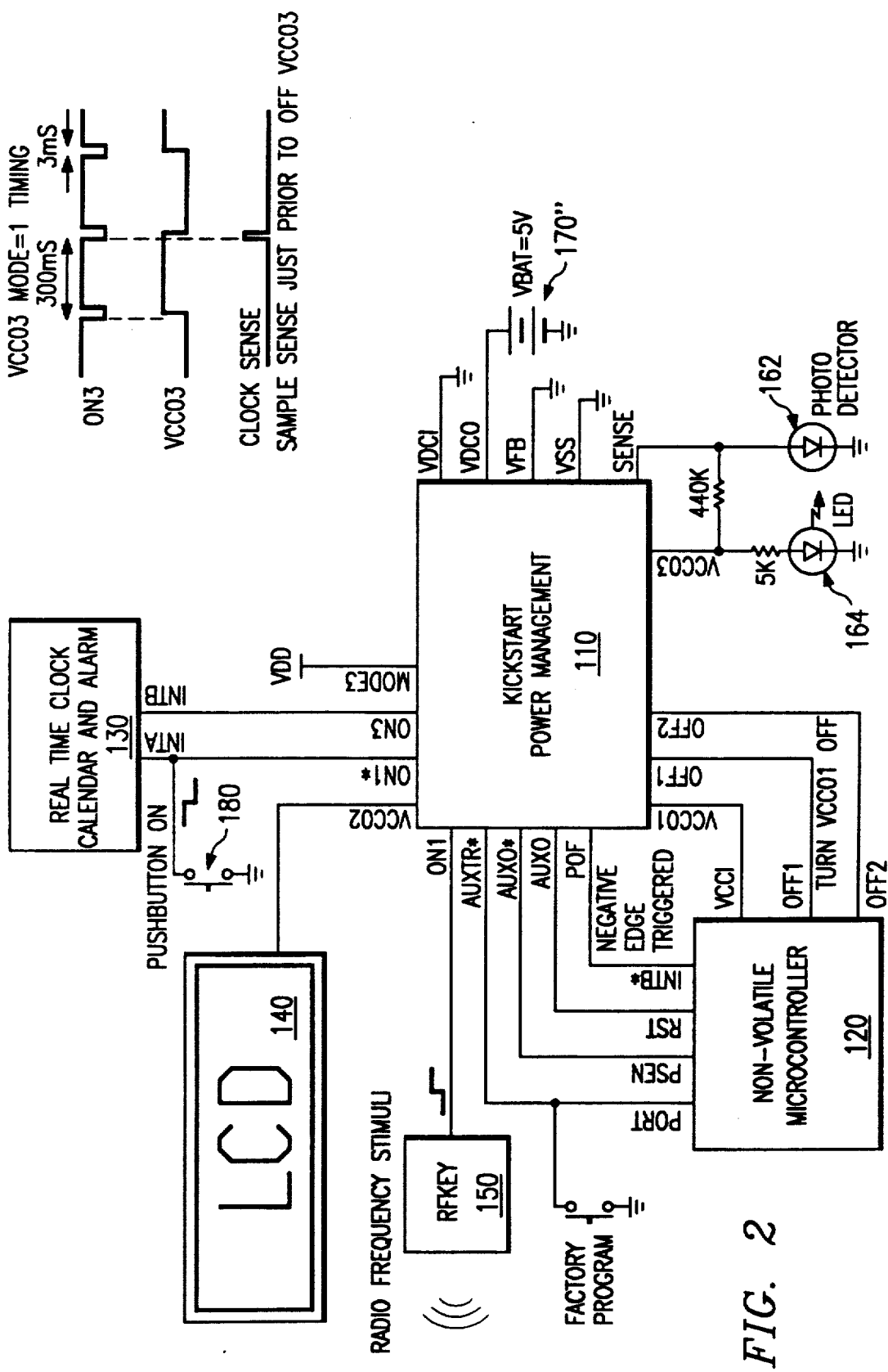
FIG. 2 shows a second sample system configuration, where the MODE3 input is tied to the supply voltage, and a 5 Volt battery is connected to the VDCO input.
Figure 3:
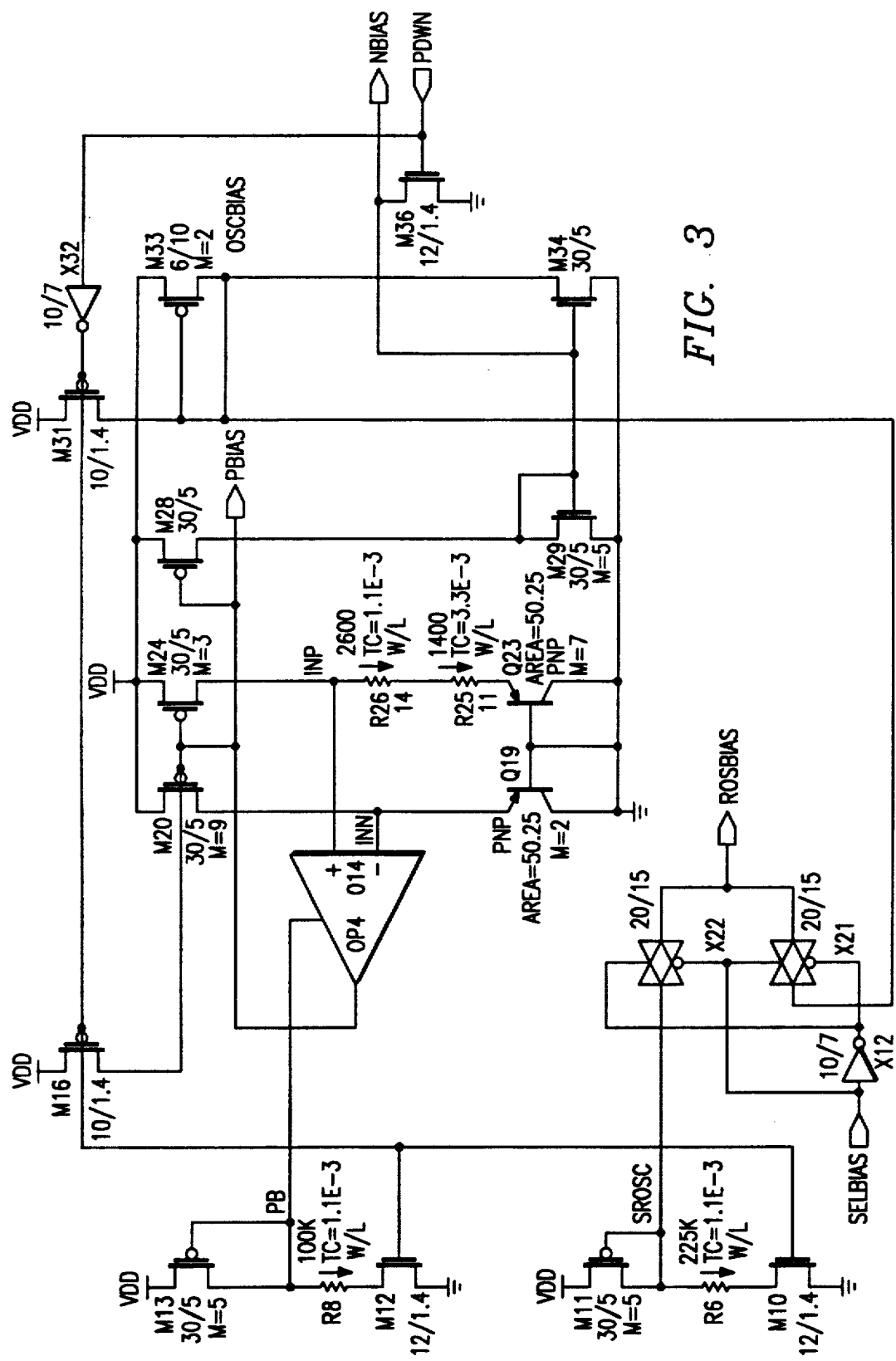
FIG. 3 shows the circuit preferably used for switching between two bias current sources.
Figure 4:
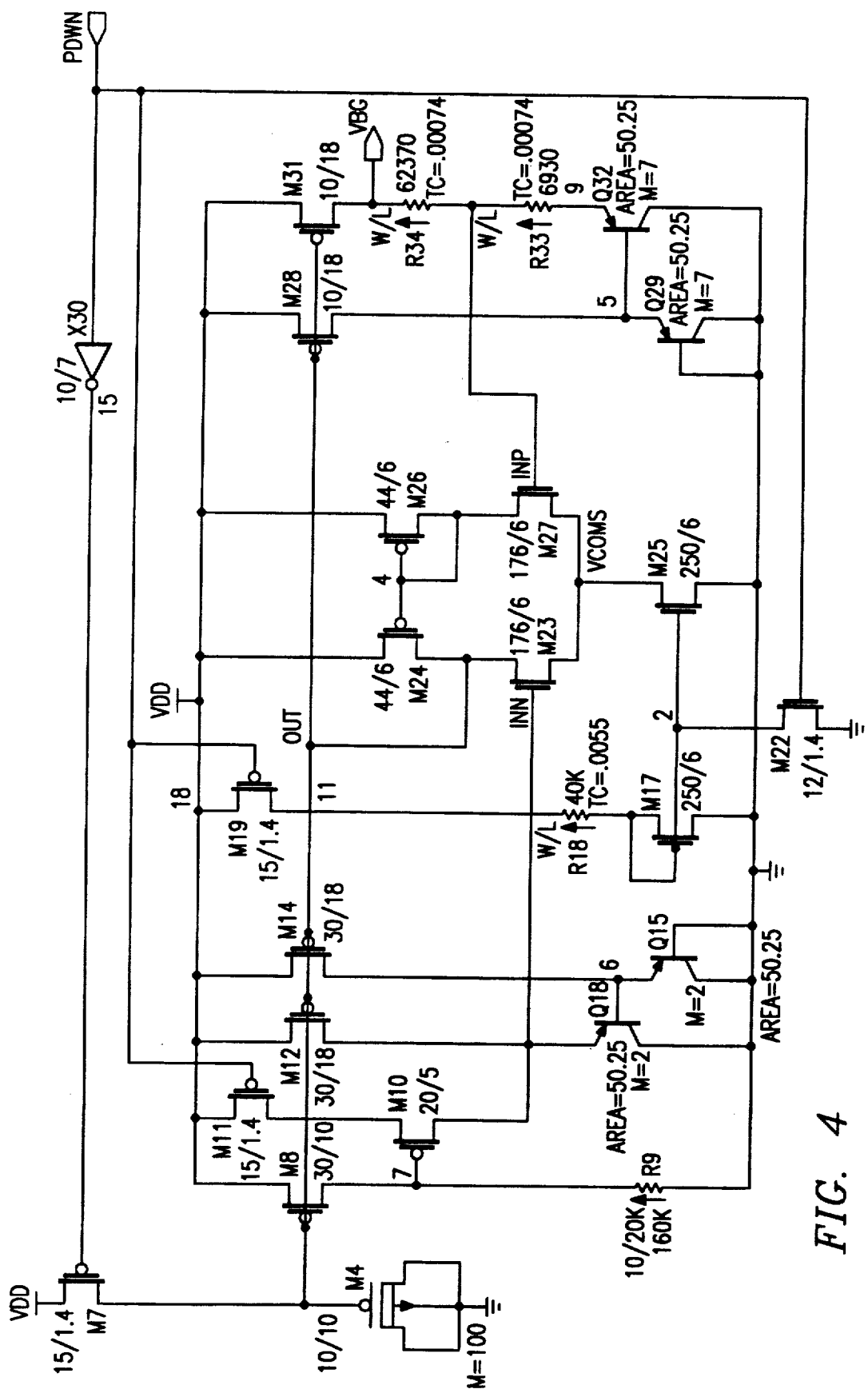
FIG. 4 shows the preferred bandgap-voltage-reference circuit.

FIGS. 1 and 2 show a sample system configuration, and indicate how the user's choices in connecting the elements can provide control inputs which the ancillary chip 110 uses to change the operation of the system.

Note that the configuration of the MODE3 pin of the ancillary chip 110 is different in FIGS. 1 and 2: in FIG. 1 the MODE3 pin is connected to ground through an RC network (a 47 pF capacitor in parallel with a 10 megohm resistor), whereas in FIG. 2 this pin is connected directly to the positive power supply $V_{DD}$.

Note also that the configuration of the VDCI and VDCO pins is different in the configurations of FIG. 1 and FIG. 2. In FIG. 1 the positive terminal of the battery 170' is connected to the VDCI pin, through an inductor (200 microHenry, in the presently preferred embodiment), and pin VDCO is connected to ground through a capacitor (100 microFarads, in the presently preferred embodiment). In FIG. 2 the VDCO pin is connected directly to the positive terminal of a battery 170", and pin VDCI is connected directly to ground.

In addition to these significant differences, FIG. 1 also shows some additional elements, which have been omitted for clarity from FIG. 2, and which will be discussed below.

The ancillary chip 110 receives power supply from a battery 170' or 170", and provides multiple power supply outputs. The output VCCO1 powers the nonvolatile microcontroller 120, and the output VCCO2 powers the liquid-crystal display driver 140. (Nonvolatile SRAM memory, including its own backup battery, is preferably attached to the microcontroller 120, but is not shown in these Figures, for clarity.) The output VCCO3 powers an LED 164, and a photodiode 162 is positioned so that, when LED 164 is shining, the output from photodiode 162 will indicate whether an obstruction has been interposed. Thus, the ancillary chip 110 can power-up or power-down any of these elements. The VDCO line (the output of the voltage conversion circuit) is also routed, in the presently preferred embodiment, to power elements which are not switched off and on.

For example, the latch 121, in the presently preferred embodiment, always receives a power supply voltage. Similarly, one of the supply voltage inputs of the microcontroller (the VBAT input, in the presently preferred embodiment) also receives a constant supply voltage. (This constant input permits data to be retained in the registers of the microcontroller, in the presently preferred embodiment. Alternatively, for even greater power saving, the VBAT pin of the microcontroller can be floated.) Similarly, the timer chip, and/or the SRAMs which the microcontroller accesses, can be powered from the VDCO line, so that their data is protected even when the microcontroller goes down.

In the presently preferred embodiment, the ancillary chip provides four power outputs VCCO1-VCCO4, but of course more or fewer outputs could be used instead. For clarity, only three of these outputs are shown in FIGS. 1 and 2. (The fourth output VCCO4 is essentially identical to the second output VCCO2, as discussed below.)

In addition, the system configuration shown includes a clock/calendar/alarm chip 130, and a wireless receiver chip (or chips) 150. These elements preferably have their own batteries (or their power supply connections), so that the ancillary chip does not control their power supply. Either of these chips can command the ancillary chip to wake up and turn other elements. In addition, a third way to awaken the system (through the ancillary chip 110) is provided by the pushbutton 180, which can be manually activated by the user. (Similarly, a pushbutton can also be connected to the line ON1, to pull that line high when the button is pushed. This additional pushbutton can be used instead of, or in addition to, pushbutton 180.)

The different connections of the MODE3 input of the ancillary kickstart chip tell the chip how to control the VCCO3 output, when a command is received from the watchdog chip 130 on input ON3. This difference may be seen by comparing the timing diagrams in the upper right corners of FIGS. 1 and 2: in the configuration of FIG. 1, each falling edge on the ON3 input leads to a timed pulse on the VCCO3 output; in the configuration of FIG. 2, each falling edge on the ON3 line toggles the VCCO3 output line.

Note that the ON3 signal (which may be received from a watchdog/timer circuit) does not itself cause power-up, but merely causes the ancillary chip to initiate a test. If the result of the test is positive, then power-up can occur. Thus, this embodiment provides a doubly conditioned wakeup—the sensor is activated only if the timer has indicated that it is time to sense, and the rest of the system is activated only if the sensor indicates that the appropriate condition has occurred.

In the presently preferred system embodiment, there are three classes of inputs which will cause the ancillary chip to initiate power-up: from signalling inputs; from activation by the watchdog/timer chip; or from sensor inputs.

In addition, the reversal of the battery and ground connections (at pins VDCI and VDCO, in the presently preferred embodiment) tells the ancillary chip whether to perform DC-DC voltage boosting, as described above.

Note that latch 121 receives an output enable signal corresponding to the VCCO2 line. (In the presently preferred embodiment, VCCO2 is inverted, to drive latch's OE*input.). The PWRON signal is used to drive the latch enable (LE) input of the latch. The latch 121, in the presently preferred embodiment, is a 74HC373 octal transparent latch with tristate outputs, but of course other parts could be substituted for this. The use of latch 121 in this position means that, under software control, the display module 140 will still see valid data (from latch 121) when the microcontroller 120 has been powered down.

In an alternative class of embodiments the latch 121 can be permanently powered, and clocked by signals which indicate when the microprocessor's power is being cut off.

Note also that the pins IO1 and OI1 (discussed below) permit the ancillary chip 110 to intercept the data link between the microcontroller 120 and an RS232 interface chip 190.

Usage and External Configuration of System

Figure 6:
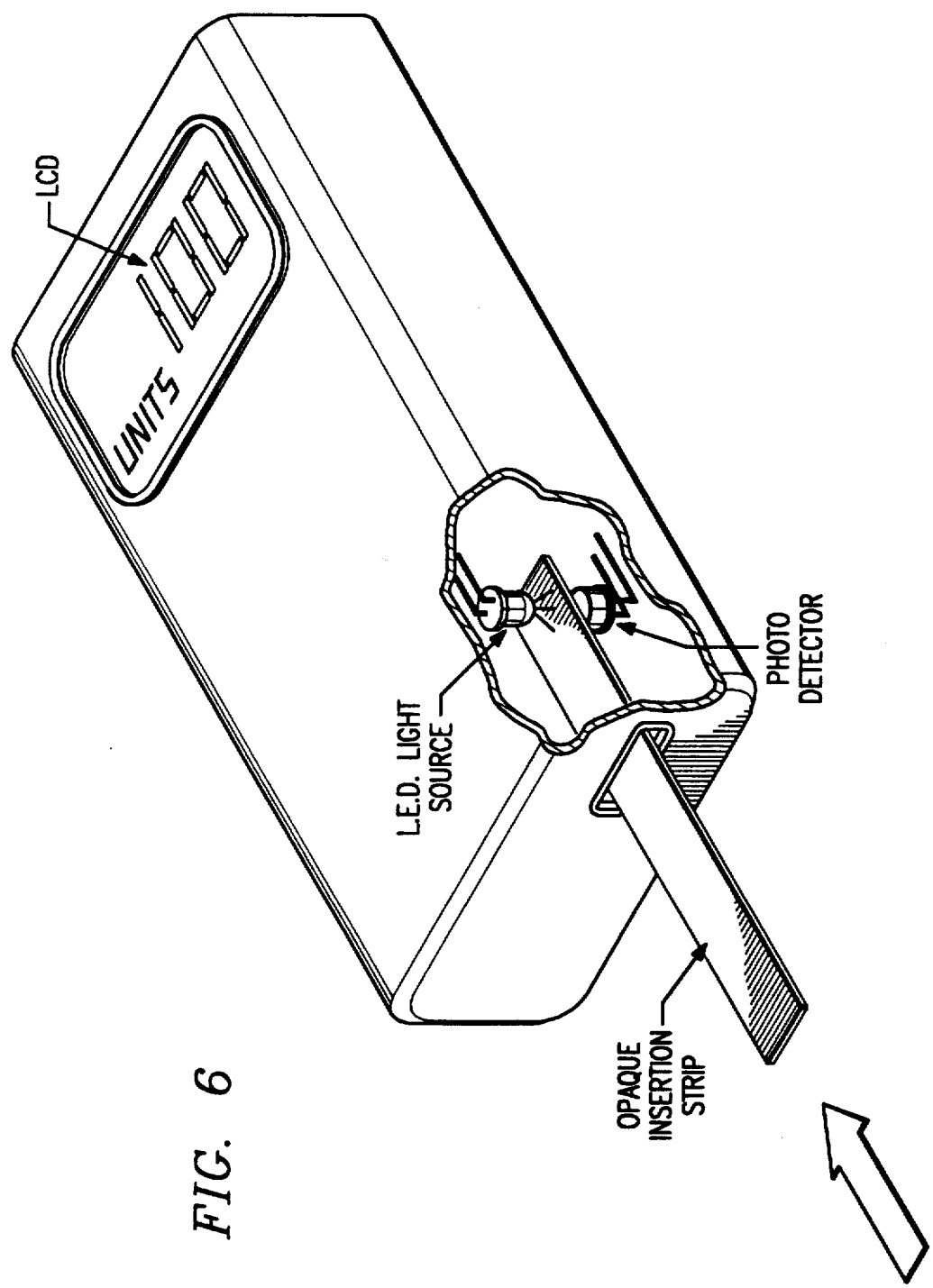
FIG. 6 shows the physical configuration of a battery-powered self-starting system which is enabled by the disclosed innovative teachings.

An example of a system where the benefits of the disclosed innovations are clear is a test station for medical samples, as shown in FIG. 6. This system is fully battery-powered, which not only adds convenience, but also provides advantages of reliability and safety in a carefully controlled environment. The disclosed system never needs to be turned on or off. It simply waits until a sample is inserted. Whenever a sample is inserted, the machine will promptly detect this, and initiate test procedures. Thus, this teaching provides a test system with no switches and no cord, whose outside interface consists solely of a slot for physical samples and a display for results. This clean interface adds to reliability and to physical cleanliness, and thus can be very advantageous in medical applications.

This sample system is specifically directed to blood-sugar monitoring for diabetics. The patient places a drop of blood on a special test stick, and immediately inserts the test stick into the self-starting test module. The test stick is treated so that the area which has been exposed to blood will darken to indicate the amount of sugar in the blood. (This can be achieved using any of a variety of compositions well known to those skilled in the art of medical testing.) The degree of darkening will depend on the blood sugar percentage, and on the time elapsed after the stick was first contacted with blood.

Conventionally, timing was performed manually. However, this is subject to user error, and therefore unreliable.

In the system of the presently preferred embodiment, the user is asked to insert the test stick immediately after it has benn wetted with blood. The unit promptly detects that a test stick has been inserted, and measures elapsed time.

The actual measurement of test stick characteristics, in the presently preferred embodiment, is done by simple reflectometry. The test stick is illuminated with white light, and the intensity of reflected light is measured. The digitized value of this intensity is translated, through a simple look-up table, into a recommended dosage. This recommended dosage is then displayed on an LCD display.

Of course, it sill be recognized by those skilled in the art that other measurement techniques can be used instead. For example, colorimetry may use two different sources (e.g. two LEDs of different types), or two differently filtered optical sensors.

In the presently preferred embodiment, a calibration input is also provided. Since the behavior of the test sticks may vary from lot to lot, each can of test sticks may have slightly different behavior. This characteristics of each can of sticks is preferably encoded as a parameter set, which is enclosed with the can and which be input to the testing unit to recalibrate it. (This occasional data input can be performed using a bar code, or a magnetic stripe, or manual entry, or even using a telephone line interface, e.g. with a DS6070 interface. The DS6070 and its data sheet are available from Dallas Semiconductor Corporation, 4350 Beltwood Parkway, Dallas Tex. 75244, and are both hereby incorporated by reference.)

The self-starting capability of this system is achieved, in this sample embodiment, by a system which includes a microcontroller, an ancillary chip as described above, a programmable timer chip (e.g. a DS1283 from Dallas Semiconductor Corp.), and an LED/photodiode pair connected to detect whether a sample has been inserted into a slot.

Since the current demands of an LED are relatively large (in relation to the power budget of a battery-operated system), it is important to minimize the amount of time during which the LED is on.

This is done, in this sample embodiment, by using the VCCO3 output of the ancillary chip to power the LED. The ancillary chip receives interrupts on its ON3' pin from the timer, and the ancillary chip's SENSE input is connected to receive the signal from a photodiode which is physically associated with the LED. Whenever the timer provides an interrupt, the ancillary chip powers up the LED (using power output VCCO3). If the photodiode has pulled SENSE high, then the ancillary chip powers up the microcontroller (using the VCCO1 power output), and the system can then operate under software control.

Preferred Pin Assignments

In the following description, the following pin and signal names may be referred to.

The pins of the ancillary chip 110, in the presently preferred embodiment, are connected as follows. Of course, it will be apparent that many other pin assignments could be substituted for that specifically described. The following pin descriptions are provided for extremely full disclosure of the best mode of carrying out the invention (as presently contemplated), and do not necessarily relate to essential features of any of the claimed innovations. The following pin descriptions refer to the 28-pin configuration of the presently preferred embodiment, but it is contemplated that 20-pin and 16-pin configurations may be useful as alternative, less preferred embodiments. The following list also indicates which pins would be brought out in a sample alternative 20-pin embodiment, and which pins would be brought out in a sample alternative 16-pin embodiment.

1. VCCO2 (used in 28-pin, 20-pin, and 16-pin versions): is a secondary voltage output which can be switched on and off only when VCCO1 is on. It is capable of maintaining an output voltage greater than (VDCO-0.25 V) at a current of 50 mA.

| VDCO | Output of DC-DC converter |
|---|---|
| VDCI | Input to DC-DC converter |
| GND | System ground |
| REGMODE | Feedback voltage sense |
| OFF1 | Shut-down control for VCCO1 |
| OFF2 | Shut-down control for VCCO2 |
| ON1 | Positive-edge trigger of VCCO1 |
| ON1' | Negative-edge trigger of VCCO1 |
| ON3' | Negative-edge trigger of VCCO3 |
| POF | Power-on indicator flag |
| AUXTR* | Negative-edge trigger input for switching AUXO and AUXO* |
| AUXO* | Auxiliary output inverted |
| AUXO | Auxiliary output |
| VCCO1 | 5 V output #1 |
| VCCO2 | 5 V output #2 |
| VCCO3 | 5 V output 3 |
| MODE3 | Mode control for VCCO3 |
| SENSE | Sensor detect input |

The VCCO2 output is controlled by the ON2/OFF2 input. In order for VCCO2 to change to reflect the ON2/OFF2* input, it is necessary that the POF pin have been reset.

2. VCOO4 (used only in 20- and 28-pin versions): is a fourth voltage output capable of maintaining a voltage greater than (VDCO-0.25 V) at a current of 10 mA. The VCCO4 output is controlled by the ON4/OFF4* input. Additionally it is necessary that the POF pin has been reset in order that VCCO4 change to reflect the ON4-/OFF4* input. 3. PWRON* (used only in 28-pin versions): is an output control signal which is low when the primary power source VCCO1 is powered on. It is useful to control external devices for power management.

4. PWRON (used in 16-, 20-, and 28-pin versions): is an output control signal which is high when the primary power source VCCO1 is powered on. It is useful to control external devices which allow a subsystem to remain powered up while a second subsystem's power has collapsed.

5. VDCO (used in 16-, 20-, and 28-pin versions): is the 5 V output which requires a large capacitor (100 microF) to ground for the boost regulator low pass output network. This is the output which is switched to the VCCO1, VCCO2, and VCCO3 outputs. In alternate power modes where boost regulation is not required, a 5 V power source may be connected directly to VDCO. In either mode the ancillary chip itself uses this VDCO as its internal supply.

6. VCCO1 (used in 16-, 20-, and 28-pin versions): is the primary output voltage source capable of maintaining an output voltage greater than (VDCO-0.25 V) at a current of 100 mA. It connects and disconnects to the VDCO output as controlled by ON1, SENSE, and OFF1 inputs.

7. VDCI (used in 16-, 20-, and 28-pin versions): is the coil input which requires an external coil connection with the BATT input serving as the other coil connection. In alternate power modes where boost regulation is not required the VDCI input should be grounded.

8. GND (used in 16-, 20-, and 28-pin versions): serves as ground.

9. IO2 (used only in 28-pin version): is a switched bidirectional input/output pin corresponding to OI2 output. The corresponding output is OI2 and the two are connected when the primary power source VCCO1 is powered on. This input alternately may be used as a voltage input for low battery detection with the LOBAT output providing the result.

10. OI2 (used only in 28-pin version): is a switched bidirectional output/input pin corresponding to IO2 input.

11. OFF1 (used in 16-, 20-, and 28-pin versions): is the negative edge triggered input used to switch off the primary voltage source VCCO1. It is functional only if the POF output has been reset to a high state after an interrupt has been generated. This is to insure that asynchronous interrupts are not missed while turning off.

12. ON2/OFF2* (used in 16-, -20, and 28-pin versions): is the level activated control of the secondary voltage source VCCO2. The VCCO2 output changes to reflect the state of the ON2/OFF2 input only if the VCCO1 output is on and the POF* output has been reset to a high state after an interrupt has been generated.

13. AUXO (used only in 28-pin version): is an open drain PMOS output, and is forced high when the AUXOTR* input is active; otherwise the output is high impedance. This pin may be connected to the PSEN pin of the DS5000 and in conjunction with the AUXO* output is useful to put the DS5000 in program mode.

14. AUXO* (used only in 28-pin version): is an open drain NMOS output, and is forced low when the AUXO* input is active; otherwise the output is tristated. This pin may be connected to the RST pin of the DS5000, and, in conjunction with the AUXO output, is useful to put the DS5000 in program mode.

15. AUXOTR* (used only in 28-pin version): is the negative edge triggered program input which controls the AUXO and AUXO* outputs and causes the Ancillary chip to enter a program mode for DS5000. An internal weak p-channel pull-up maintains the AUXOTR* pin in a high state while the VCCO1 is on. Program mode may be entered only when the primary power VCCO1 is on. A negative input maintained for about 20 ms will cause the AUXO and the AUXO* outputs to become active. These outputs will remain in their active states until AUXOTR* is brought high and then once again brought back and maintained low for 20 ms. While AUXO and AUXO* are active, all on/off inputs are disabled.

16. OI1 (used only in 20- and 28-pin versions): is a switched bidirectional output/input pin, which is connected to pin IO1 when the primary power source VCCO1 is powered on. When pins OI1 and IO1 are connected, the path between them can carry 10 mA of current with less than 500 mV of voltage drop.

17. IO1/RXDET (used in 16-, 20-, and 28-pin versions): is the switched bidirectional input/output pin corresponding to OI1. (The two are connected when the primary power source VCCO1 is powered on.) The RXDET function of this pin also serves as a stimulus for kickstarting VCCO1; in this function it is somewhat analogous to ON1, except that, once PWRON is active, negative edges at the RXDET input will not generate interrupts at POF*. Thus, this function is useful for kickstarting the system when a falling edge is seen at DOUT of the RS232 transceiver; however, the following data edges in the RS232 data stream do not generate additional interrupts. The transceiver, in the presently preferred embodiment, is a DS1275; this integrated circuit and its data sheet are available from Dallas Semiconductor Corporation, 4350 Beltwood Parkway, Dallas Tex. 75244, and are both hereby incorporated by reference.

18. ON3' (used in 16-, 20-, and 28-pin versions): switches the VCCO3 output on and off as determined by the MODE3 pin. ON3' is a negative edge triggered input.

19. ON1' (used in 16-, 20-, and 28-pin versions): is the negative edge triggered counterpart of ON1 and functionally is identical with opposite polarity input. It may be interfaced with the DS1283 (timer) interrupt outputs for time based "on" stimuli.

20. ON1 (used only in 28-pin version): is the positive edge triggered input that switches the primary VCCO1 output on. The input is internally pulled low via a weak resistor. A high going edge normally initiates a startup period, during which the switching boost regulator is activated, and VCCO1 is switched on once VDCO has achieved a voltage of 4.75 V. Once the primary power VCCO1 is latched on, a positive edge at this input generates an active low interrupt signal at POF. This pin may be interfaced with the DS1209 (wireless communication decoder) RST* output for "on" stimuli generated by incoming signals on the RF channel. (In the configurations of FIGS. 1 and 2, note that input ON1' is connected to the clock/calendar chip 139, while input ON1 is connected to the RF interface chip 150.) The DS1209 and its data sheet are available from Dallas Semiconductor Corporation, 4350 Beltwood Parkway, Dallas Tex. 75244, and are both hereby incorporated by reference. Additional information regarding the DS1209, and its relation to other chips and components to provide a complete wireless data interface, may be found in U.S. patent application Ser. Nos. 282,819, filed Dec. 9, 1988, and 283,534, filed Dec. 9, 1988, both of which are hereby incorporated by reference.

21. REGMODE (used in 16-, 20-, and 28-pin versions): is the regulation mode control which when connected to VDCO kills the internal regulator and prevents the internal oscillator from driving VDCI low, and thus allows the use of a battery or supply tied directly to the VDCI or VDCO input. This input should be tied low for normal boost regulation.

22. OSCEXT (used only in 28-pin version): This pin provides an AC output. In the boost regulating mode (REGMODE low), this output can be used to control an additional switching-mode boost regulator stage, using an external MOS switch, diode, and coil. In D.C. mode (REGMODE high), this output provides a continuous 40 kHz clock for generating negative or doubled voltages.

23. POF* (used in 16-, 20-, and 28-pin versions): is the bidirectional active low interrupt. It is automatically activated by a power-on sequence as VCCO1 turns on and must be externally reset in order to enable the OFF inputs. The pin may be reset by writing a strong high voltage to the pin which will switch the state of the latch thereby weakly hold a high. The interrupt becomes active whenever any of three inputs (the ON1, ON1*, or SENSE inputs) are triggered. The interrupt is held low whenever primary power source VCCO1 is off.

24. SENSE (used in 16-, 20-, and 28-pin versions): is sampled just prior to the VCCO3 output being disconnected to determine if it is externally pulled high. The detector input is internally pulled low via a current source sinking approximately 20 microA. If the input is externally pulled high via a pullup device it generates an internal "on" trigger equivalent to that produced by either of the ON1 inputs.

25. MODE3 (used in 16-, 20-, and 28-pin versions): is sampled at the beginning of a negative ON3' transition to determine the on/off mode of the VCCO3 output. If, when sampled, the pin appears high, then mode=1 is selected; but if the pin appears grounded, then mode=0 is selected. Mode=1 puts the ancillary chip into an edge driven mode for VCCO3 with the first rising edge of ON3 turning on VCCO3 and the next turning it off. Connecting an external capacitor $C_{mode}$ (and a large resistor in parallel) from the pin to ground makes the mode pin appear initially grounded and mode=0 is selected. While VCCO3 is on, mode=0 causes the MODE3 pin to source a constant current of 20 microA which charges the external capacitor. In this mode the VCCO3 output remains high until the mode pin reaches approximately ½VDCO and then shuts off. When both VCCO1 and VCCO2 are off, only in mode=1 will will the boost regulator be activated for the VCCO3 output.

26. ON4/OFF4* (used only in 20- and 28-pin versions): is the level activated control of the fourth voltage output VCCO4. The VCCO4 output turns on when ON4/OFF4 is high and off when ON4/OFF4 is low. The VCCO4 output changes to reflect the state of the ON4/OFF4 input only if the VCCO1 output is an and the POF* output has been reset to a high state after an interrupt has been generated.

27. LOBAT* (used only in 28-pin version): is active low output that indicates a low battery when the voltage at IO2 is less than 1.25 V.

28. VCCO3 (used only in 20- and 28-pin versions): is a third switched output, and is capable of maintaining an output voltage greater than (VDCO-0.25 V) at a current of 50 mA. The on/off mechanism for VCCO3 is controlled by the MODE3 pin.

Functional Description

The detailed operation of the ancillary chip 110 will now be described.

Control of Primary Power Output VCCO1

Each of the ON1, ON1', IO1/RXDETECT, and SENSE pins is capable of initiating a power-up of the VCCO1 output pin. Internally these inputs cause a start sequence to be initiated (assuming an initial powered down state).

In the normal boost configuration the VDCO output will be a diode drop lower than VDCI, and the entire chip will bootstrap from this VDCO voltage. While the VDCO output slews up to the boost value, its voltage is monitored with an internal comparator, and the ancillary chip stays in a start mode. When VDCO reaches approximately 4.75 V, an internal signal HIENUF is latched, and this then allows the VCCO1 PMOS device to be switched on. The duration of this turn-on process is at least 16 clock periods (nominally 400 microsec), but the time constants of the external LCR components will typically means that the turn-on duration is considerably longer (e.g. in the millisecond range). If subsequent loading of the VCCO outputs causes VDCO to drop below 3 V, the ancillary chip will switch off the VCCO PMOS devices, and monitor the VDCO voltage for the 4.75 V trip point before reconnecting the load. This provides the advantage that, when the ancillary chip is first being powered up, the voltage conversion circuitry is loaded only by the small internal load of the ancillary chip (about 200 microAmperes, in the presently preferred embodiment).

If this switching causes the power control regulation loop to oscillate, passive regulation elements may be modified as follows: if large capacitive loads are present, charge sharing may cause the output to dip below 3 V; in this case a larger regulation capacitor can be used at the VDCO pin. If large resistive loads are present, a smaller inductor value and larger capacitance can be used. If the required load current would cause the peak current specification of the VDCI pin to be exceeded, the external oscillator OSCEXT can be used to drive an additional switching-mode boost regulator.

Control of Secondary Power Output VCCO2

Once VCCO1 has been turned on and the POF signal has been reset after the power-up, the VCCO2 will change in accordance with the level of the ON2/OFF2 input. If the POF* pin is low or the VCCO1 output turns off, however, then the VCCO2 output is latched and maintains its current on/off setting.

Interrupt and Off Control

As a result of initial power-up, the POF pin is latched low. This pin has a weak NMOS pulldown forming a latch; thus, externally driving the pin with a strong high signal will switch the state of the latch, thereby resetting the interrupt. This interrupt should be reset as part of any normal power-on sequence if further kickstart-generated interrupts are desired. Furthermore the POF pin must be reset in order to perform a power-off sequence: A negative edge at the OFF1 pin will switch off the VCCO1 output only if the POF pin has been reset high. Similarly POF must be reset to shut off VCCO2 with the OFF2 input. Normally the oscillator is killed during the off sequence unless the VCCO2 and/or VCCO3 and/or VCCO4 output is on, in which case the boost regulator will continue to function until all outputs also are switched off (unless otherwise disabled by the REGMODE input).

Control of Third Power Output VCCO3

The third output voltage is controlled by the ON3' and MODE3 inputs. If VCCO3 is initially off, a negative edge at ON3' immediately turns the PMOS device for VCCO3 on (i.e. there is no waiting period during the startup phase as VDCO climbs).

If MODE3 is tied high (i.e. to VDCO, so that MODE3=1), the ancillary chip goes into an edge relationship, wherein VCCO3 is maintained in the high state until a second occurrence of a falling edge at ON3' (at which time the PMOS device for VCCO3 is turned off).

The alternative MODE3 configuration (MODE3=0) uses a capacitor (and large parallel resistor) connected from the MODE3 input to ground. In this mode a current source to VDCO (a resistor of approximately 250 kilohm, with a PMOS current mirror) sources charge to the capacitor, whose voltage slowly rises as it is charged. When the voltage reaches approximately VDCO/2, the VCCO3 output device is switched off and a brief discharge of the capacitor occurs.

(Internally, the falling edge of ON3' causes the state of the MODE3 pin to be latched, thus determining the subsequent mode behavior.)

Control of Fourth Power Output VCCO2

Once VCCO1 has been turned on, the VCCO4 output will change in accordance with the level of the ON4/OFF4 input, identically as described above for VCCO2.

SENSE Strobed Detector Input

This capability is useful to periodically power-up some portion of a system with the VCCO3 output, and then determine whether the entire system should be powered up. (For example, this capability is used, in the system configuration described below, to sense the output of a photodiode or phototransistor while an LED is turned on.) The SENSE pin has an internal pulldown device (approximately 250 kilohm) which is only active when VCCO3 is on. The SENSE voltage is sampled immediately prior to VCCO3 being turned off (in either mode). If the input has been externally pulled high, then the startup sequence outlined in part 1 above is initiated.

Electrical Interface

The standard 8051 port architecture provides a large NMOS pull-down (e.g. a 4000 microA sink), which is driven by the output of the data latch. The same data latch output also directly controls a weak PMOS pull-up transistor (e.g. a 50 microA source), and, through a one-shot, also controls a strong PMOS pull-up (e.g. a 4000 microA source). In a bidirectional port, the pad will also be connected to an input latch, which is fed back to a moderate PMOS pull-up (e.g. a 400 microA source).

The DS5000 microcontroller used in the presently preferred embodiment includes ports of this kind. To interface to, and test, such a port, the ancillary chip's port, in the preferred embodiment, has a strong N-channel, driven by a one-shot, and a medium-strength (preferably 200 microA or less) pull-down transistor. (The DS5000 also includes a "load mode," which requires abnormal pin states which go beyond the specifications of the Intel port architecture. In this mode, PSEN must be pulled low and RST must be pulled high.) In the system of the presently preferred embodiment, this capability is exploited so that the 120 can tell the ancillary chip 110 (with an edge) to put microcontroller 120 into program mode.

Detection of Connection Reversal

Figure 5:
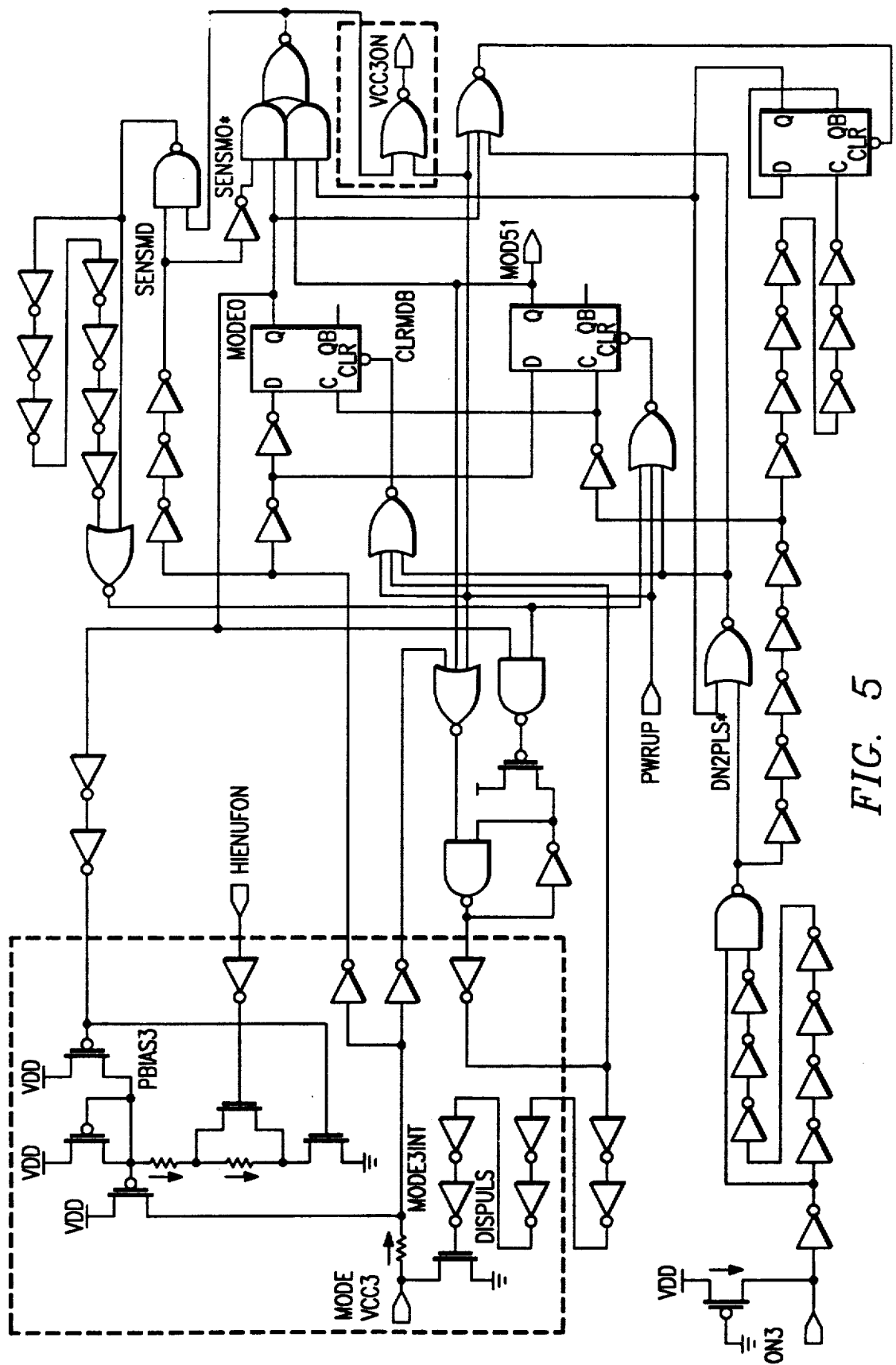
FIG. 5 shows the specific circuitry used, in the presently preferred embodiment, to detect the configuration of the MODE3 pin.

FIG. 5 shows the specific circuitry used, in the presently preferred embodiment, to detect the configuration of the MODE3 pin. The circuitry shown in the dashed box, at the left of the figure, provides two different charging rates for the external capacitor, depending on the voltage present. Each inverter in the three inverter chains 510, in the presently preferred embodiment, has a p-channel nominal width ($W_P$) of 7 microns, an n-channel width ($W_N$) of 5 microns, and a channel length for both types ($L_P$ and $L_N$, respectively) of 10 microns.

Device Implementation

In the presently preferred embodiment, the ancillary chip has been implemented in 1.2 micron CMOS technology, using a single layer of metal and a single layer of polysilicon. (Of course, many other process technologies could be used.) In the presently preferred embodiment, this results in a chip size of 112 by 124 mils.

The device structure and layout techniques of the ancillary chip of the presently preferred embodiment are in most respects conventional. However, a few unusual features are added, to minimize leakage currents.

First, the minimum gate length of the NMOS devices has been increased by 17%, to 1.4 microns nominal. (The minimum gate length of the PMOS devices continues to be 1.2 microns nominal, to provide ample drive capability.) This provides significantly decreased off-state leakage.

Second, a very large diode structure (thousands of square microns) is used for the "catch" diode, which isolates VDCI from VDCO.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested are merely illustrative. These examples may help to show some of the scope of the inventive concepts, but these examples do not nearly exhaust the full scope of variations in the disclosed novel concepts.

For example, the presently preferred embodiment uses a microcontroller as the programmable processor, but of course a wide variety of microprocessors (or other types of processor) could be used instead.

As will be recognized by those skilled in the art, the innovative concepts described in the present application can be modified and varied over a tremendous range of applications, and accordingly their scope is not limited except by the allowed claims.

What is claimed is:

1. A system, comprising:
    a microprocessor;
    communication lines coupling said microprocessor to a communication channel interface;
    a battery;
    a timer circuit;
    at least one additional electronic component;
    an ancillary integrated circuit, connected
        to receive power from said battery, and
        to selectably provide power to said microprocessor, and
        to selectably provide power to said additional component, and
        to receive interrupts from said timer circuit;
    wherein at least one of said communications lines is routed through said ancillary integrated circuit, and said ancillary integrated circuit contains a switch to connect/disconnect said at least one of said communications lines.

2. The system of claim 1, wherein said ancillary integrated circuit controls said isolation gates in accordance with factors including the power-down status of said microprocessor.

3. The system of claim 1, wherein said ancillary integrated circuit monitors data communications sent to said microprocessor, and immediately powers up said microprocessor, and opens said isolation gates, at the onset of any data communication directed to said microprocessor.

4. The system of claim 1, wherein said timer circuit provides multiple interrupt output lines, and said ancillary integrated circuit is connected to at least one of said interrupt output lines.

5. The system of claim 1, wherein said timer circuit provides multiple interrupt output lines.

6. The system of claim 1, wherein said battery has an output voltage of no more than about 3 Volts.

7. The system of claim 1, further comprising an integrated circuit display driver coupled to said microprocessor, and a liquid crystal display coupled to said integrated circuit display driver.

8. The system of claim 1, wherein said ancillary integrated circuit includes on-chip voltage-boosting circuitry at said battery power supply connection, to provide an increased voltage which is higher than the voltage of said battery.

9. The system of claim 1, further comprising at least one integrated circuit which is optimized to provide an interface from said communication lines to a communications channel of a predetermined type.

10. The system of claim 1, further comprising at least one integrated circuit which is optimized to provide an interface from said communication lines to a serial communications channel.

11. The system of claim 1, further comprising at least one integrated circuit which is optimized to provide an interface from said communication lines to a wireless communications channel.

12. The system of claim 1, wherein said ancillary integrated circuit is constructed in complementary metal oxide semiconductor (CMOS) technology wherein the minimum gate length of N-channel transistors is at least 10% greater than the minimum gate length of P-channel transistors.

13. The system of claim 1, wherein said microprocessor, said timer circuit, and said sensor circuit are powered solely by said battery.

14. The system of claim 1, further comprising a data latch connected to receive and latch data outputs from said microprocessor, said data latch having a power supply which is independent of the power supply of said microprocessor.

15. The system of claim 1, further comprising a data latch connected to receive and latch data outputs from said microprocessor, said data latch having a power supply which is independent of the power supply of said microprocessor, and a display connected to receive data from said microprocessor through said data latch.

16. The system of claim 1, further comprising a display connected to receive data from said microprocessor.

17. The system of claim 1, further comprising memory connected to said microprocessor.

18. The system of claim 1, further comprising nonvolatile memory connected to said microprocessor.

19. A system, comprising:
a microprocessor;
a battery;
at least one additional integrated circuit;
communication lines coupling said microprocessor to said at least one additional integrated circuit;
an ancillary integrated circuit, connected
to receive power from said battery, and
to selectably provide power to said microprocessor, and
to selectably provide power to said additional integrated circuit, and
to receive interrupts from at least one source which is independent of said microprocessor;
wherein at least one of said communications lines is routed through said ancillary integrated circuit, and said ancillary integrated circuit contains a switch to connect/disconnect said at least one of said communications lines.

20. The system of claim 19, wherein said ancillary integrated circuit controls said isolation gates in accordance with factors including whether power is being supplied to said microprocessor.

21. The system of claim 19, wherein said ancillary integrated circuit monitors data communications sent to said microprocessor, and immediately powers up said microprocessor, and opens said isolation gates, at the onset of any data communication directed to said microprocessor.

22. The system of claim 19, wherein said battery has an output voltage of no more than about 3 Volts.

23. The system of claim 19, wherein said ancillary integrated circuit includes onchip voltage-boosting circuitry at said battery power supply connection, to provide an increased voltage which is higher than the voltage of said battery.

24. The system of claim 19, wherein said ancillary integrated circuit is constructed in complementary metal oxide semiconductor (CMOS) technology.

25. The system of claim 19, wherein said ancillary integrated circuit is constructed in complementary metal oxide semiconductor (CMOS) technology wherein the minimum gate length of N-channel transistors is at least 10% greater than the minimum gate length of P-channel transistors.

26. The system of claim 19, further comprising a data latch connected to receive and latch data outputs from said microprocessor, said data latch having a power supply which is independent of the power supply of said microprocessor.

27. The system of claim 19, further comprising memory connected to said microprocessor.

28. The system of claim 19, further comprising nonvolatile memory connected to said microprocessor.

29. The system of claim 19, further comprising nonvolatized memory connected to said microprocessor, said nonvolatized memory including SRAMs and an additional battery which is not connected to said ancillary integrated circuit.

30. A system, comprising:
a microprocessor;
a battery;
an interface chip, which
provides an interface to a serial communications channel and also
provides a data-received line and a transmit-data line, and is configured so that said interface chip will drive said data-received line with data received from the channel, and
will drive the channel with data seen on said transmit-data line; and
an ancillary integrated circuit, connected
to receive power from said battery, and
to selectably provide power to said microprocessor, and
wherein said transmit-data line of said interface chip is operatively connected to said microprocessor;
and wherein said data-received line from said interface chip is routed through said ancillary chip to said microprocessor, and said ancillary integrated circuit contains a switch to connect/disconnect said data-received line.

31. The system of claim 30, wherein said ancillary integrated circuit controls said isolation gates in accordance with factors including the power-down status of said microprocessor.

32. The system of claim 30, wherein said ancillary integrated circuit monitors data communications sent to said microprocessor, and immediately powers up said microprocessor, and opens said isolation gates, at the onset of any data communication directed to said microprocessor.

33. The system of claim 30, wherein said battery has an output voltage of no more than about 3 Volts.

34. The system of claim 30, wherein said ancillary integrated circuit is constructed in complementary metal oxide semiconductor (CMOS) technology.

35. The system of claim 30, wherein said ancillary integrated circuit is constructed in complementary metal oxide semiconductor (CMOS) technology wherein the minimum gate length of N-channel transistors is at least 10% greater than the minimum gate length of P-channel transistors.

* * * * *